US012456806B2

(12) United States Patent
Yang et al.

(10) Patent No.: US 12,456,806 B2
(45) Date of Patent: Oct. 28, 2025

(54) ACTUATOR FOR MULTIPHASE SHIFTER

(71) Applicant: Suzhou Luxshare Technology Co., Ltd., Suzhou (CN)

(72) Inventors: Chongli Yang, Suzhou (CN); Zhengguo Zhou, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 408 days.

(21) Appl. No.: 18/091,800

(22) Filed: Dec. 30, 2022

(65) Prior Publication Data

US 2024/0145915 A1 May 2, 2024

(30) Foreign Application Priority Data

Oct. 27, 2022 (CN) ......................... 202211323246.3

(51) Int. Cl.

*H01Q 3/36* (2006.01)

*H01Q 1/12* (2006.01)

(52) U.S. Cl.

CPC ................. *H01Q 3/36* (2013.01); *H01Q 1/12* (2013.01)

(58) Field of Classification Search

CPC ............ H01Q 3/36; H01Q 1/12; H01Q 1/246; H01Q 3/32

See application file for complete search history.

(56) References Cited

U.S. PATENT DOCUMENTS

2020/0373663 A1* 11/2020 Xu ........................ H01Q 3/2688
2022/0231413 A1* 7/2022 Everest .................... H01Q 3/32
2023/0163448 A1* 5/2023 Qin .......................... H01Q 3/32
343/702

FOREIGN PATENT DOCUMENTS

CN 111987459 A 11/2020

* cited by examiner

*Primary Examiner* — Zhitong Chen

(74) *Attorney, Agent, or Firm* — Birch, Stewart, Kolasch & Birch, LLP

(57) ABSTRACT

An actuator includes a base body, a gear, a rack, a coupling member, a number of connecting elements, and a number of telescopic rods. Two driving rods work asynchronously. A first rod extends along the transverse direction and a number of second rods extending along the transverse direction. The gear meshes with the rack. The rack is slidable on the base body along the transverse direction. The second rods are rotable around their own second central axes when they are respectively driven by the first rod. The coupling member is sleeved on the first rod and selectively mating with one of the second rods. The coupling member is fixedly connected to the rack. Each connecting element is moveable on the corresponding telescopic rod. The present disclosure is beneficial to miniaturization, and power transmission of the present disclosure is more stable and more precise.

18 Claims, 16 Drawing Sheets

ACTUATOR FOR MULTIPHASE SHIFTER

CROSS-REFERENCE TO RELATED APPLICATION

This patent application claims a priority of a Chinese Patent Application No. 202211323246.3, filed on Oct. 27, 2022 and titled "ACTUATOR", the entire content of which is incorporated herein by reference.

TECHNICAL FIELD

The present disclosure relates to an actuator for multiphase shifter, belonging to the technical field of base station antennas.

BACKGROUND

With the development of the mobile communication industry, in order to meet the needs of accurate coverage and laying costs, electrically adjustable antennas have been widely used. The electronically adjustable antenna can change the phase of the core component phase shifter to adjust the tilt angle of the radiation beam by remotely controlling the transmission system, thereby realizing the adjustment of the network coverage area. As the number of phase shifters increases, the complexity of the actuator increases. Existing actuators either occupy a large height space or a large longitudinal space, which increases the difficulty of the overall layout of the antenna and is not conducive to miniaturization design.

SUMMARY

An object of the present disclosure is to provide an actuator for multiphase shifter, the space in the height direction and the space in the longitudinal direction of which are saved. The present disclosure is beneficial to miniaturization and at the same time, and the power transmission thereof is more stable and more precise.

In order to achieve the above object, the present disclosure discloses an actuator including a base body, a first driving rod and a second driving rod working asynchronously, a gear and a rack, a first rod and a plurality of second rods being positioned on the base body, a coupling member, a plurality of connecting elements and a plurality of telescopic rods. When the second driving rod is not in work, the first driving rod drives the gear to rotate around the axis of the gear. The gear meshes with the rack. The rack extends along a transverse direction and the rack is slidable on the base body along the transverse direction. The first rod has a first central axis extending along the transverse direction. When the first driving rod is not in work, the second driving rod drives the first rod to rotate around the first central axis. Each second rod has a second central axis extending along a longitudinal direction. The second rods are rotable around their own second central axes when they are respectively driven by the first rod. The coupling member is sleeved on the first rod and selectively mating with one of the second rods. The coupling member is fixedly connected to the rack. The transverse slippage of the rack drives the movement of the coupling member on the first rod. The rotation of the coupling member accompanies with the rotation of the first rod for driving the rotation of the second rod. Each connecting element slides on the corresponding telescopic rod for stretching out and retracting of the corresponding telescopic rod.

In order to achieve the above object, the present disclosure further discloses an actuator including a base body, an actuation module, a gear, a rack, a first rod, a plurality of second rods, a coupling member, a plurality of connecting elements and a plurality of telescopic rods. The actuation module has both a first driving rod and a second driving rod and makes sure that one driving rod is not in work while the other one driving rod starts working. When the second driving rod is not in work, the first driving rod drives the gear to rotate around the axis of the gear. The gear meshes with the rack. The rack extends along an X direction and the rack is slidable on the base body along the X direction. The first rod is positioned on the base body and has a first central axis extending along the X direction. When the first driving rod is not in work, the second driving rod drives the first rod to rotate around the first central axis. The second rods are positioned on the base body. Each second rod has a second central axis extending along a Y direction which is perpendicular to the X direction. The second rods are selected to rotate around their own second central axes. The coupling member is sleeved on the first rod and selectively mates with one of the second rods. The coupling member is fixedly connected to the rack. The transverse slippage of the rack drives the movement of the coupling member on the first rod. The rotation of the first rod drives the rotation of the second rod via the coupling member. Each connecting element correspondingly slides on the telescopic rod, for stretching out and retracting of the corresponding telescopic rod.

Compared with the prior art, the actuator of the present disclosure saves the space of the actuator in the height direction by arranging a plurality of the telescopic rods parallel in the longitudinal direction; the first driving rod of the actuator of the present disclosure drives the rack extending in the transverse direction and the longitudinal telescopic rods are selected to be driven through the transverse movement of the rack, for saving the space of the actuator in the longitudinal direction. Therefore, the actuator of the present disclosure is beneficial to miniaturization, and the power transmission is more stable and more precise.

DETAILED DESCRIPTION

Figure 1:
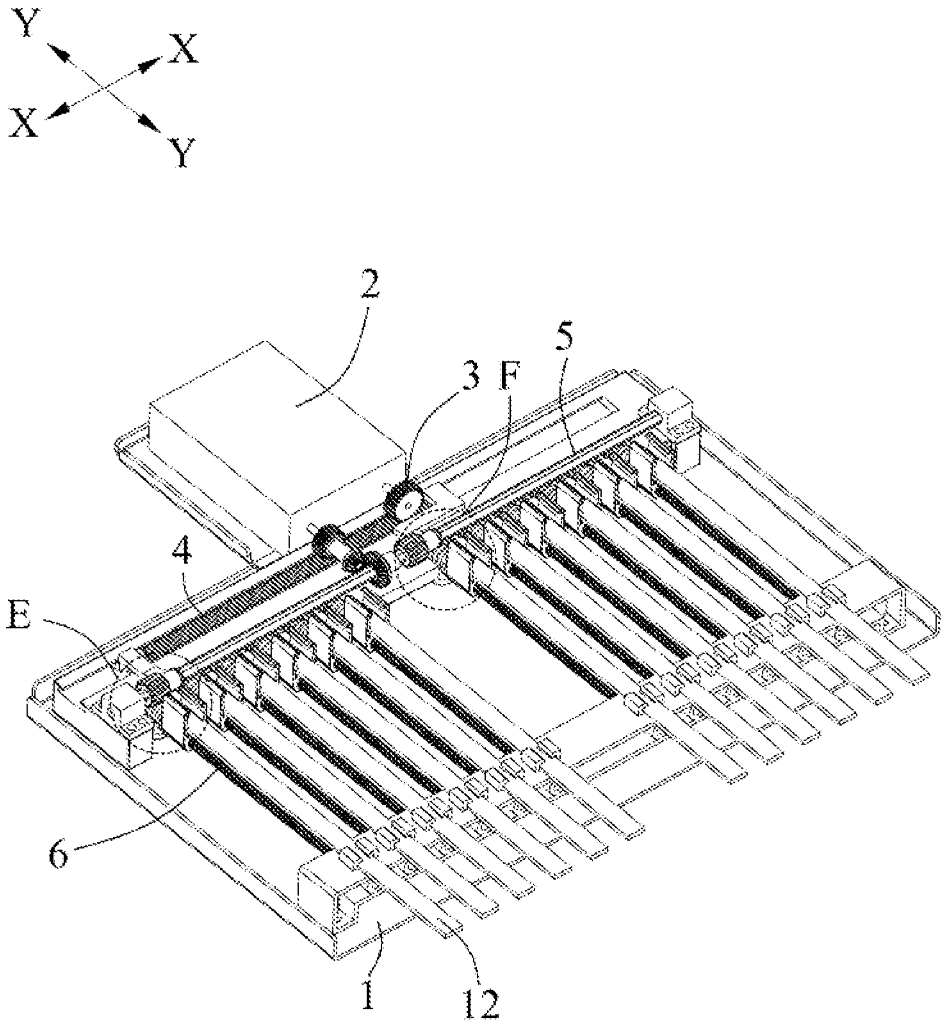
FIG. 1 is a perspective, assembled view of an actuator in accordance with a first embodiment of the present disclosure, in which all linkages are not extended.
Figure 2:
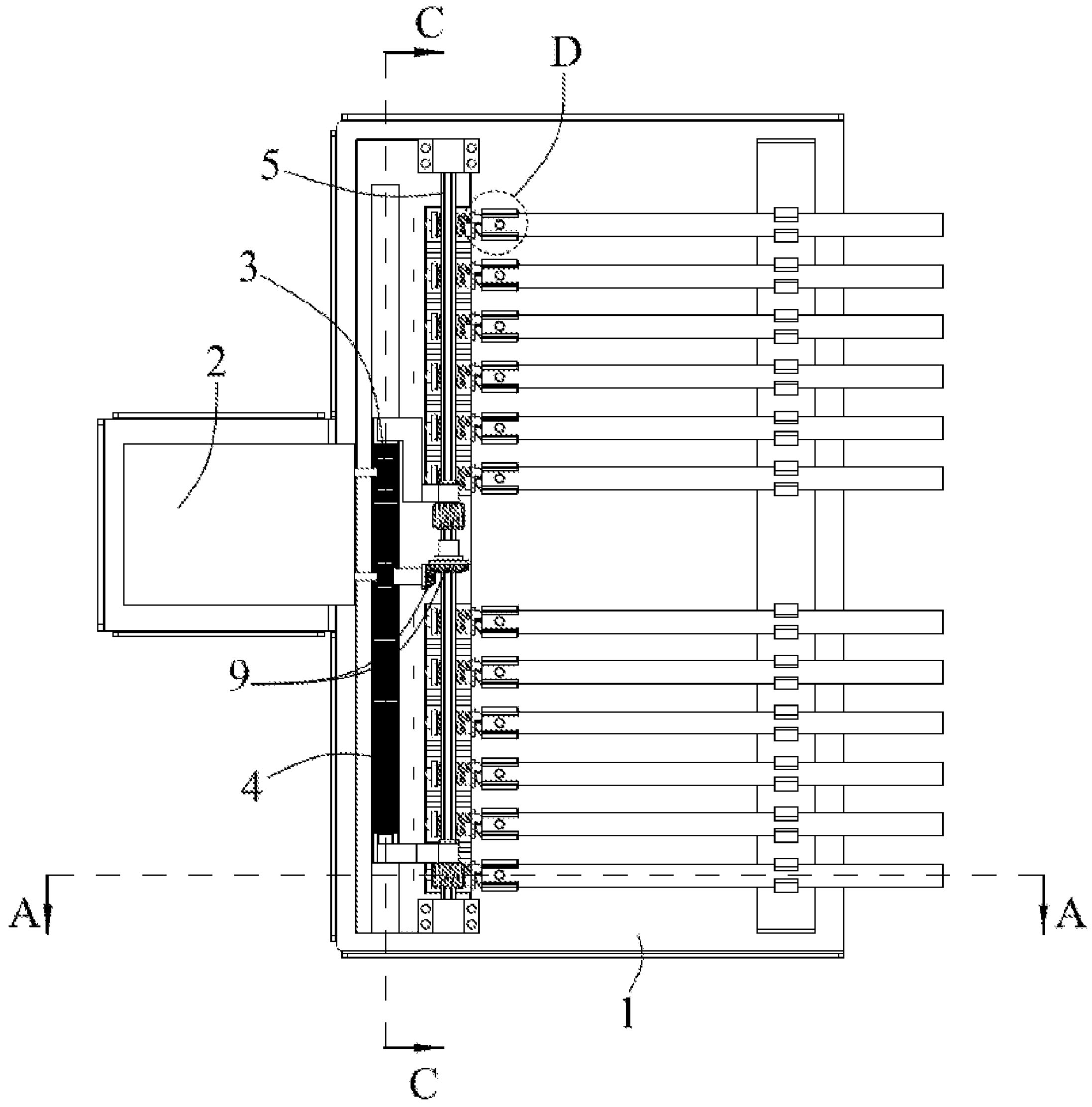
FIG. 2 is a top plan view of FIG. 1.
Figure 3:
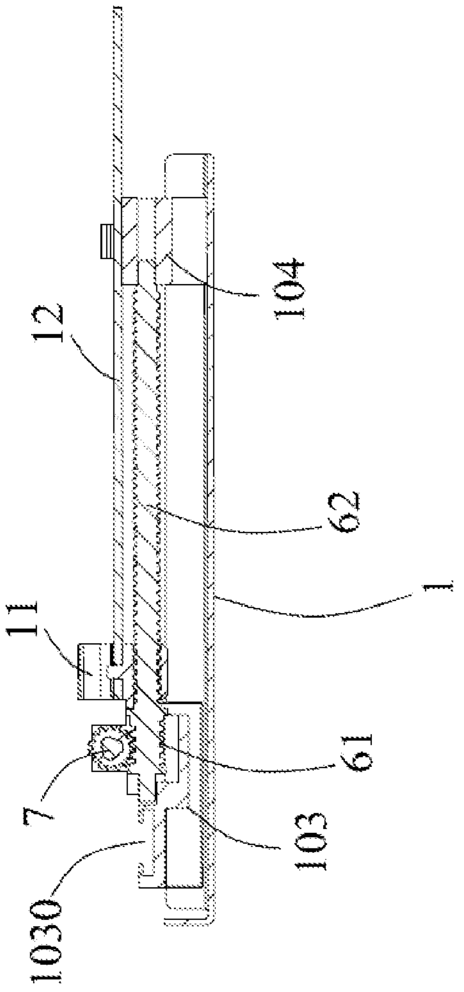
FIG. 3 is a cross-sectional view taken along line A-A in FIG. 2.
Figure 4:
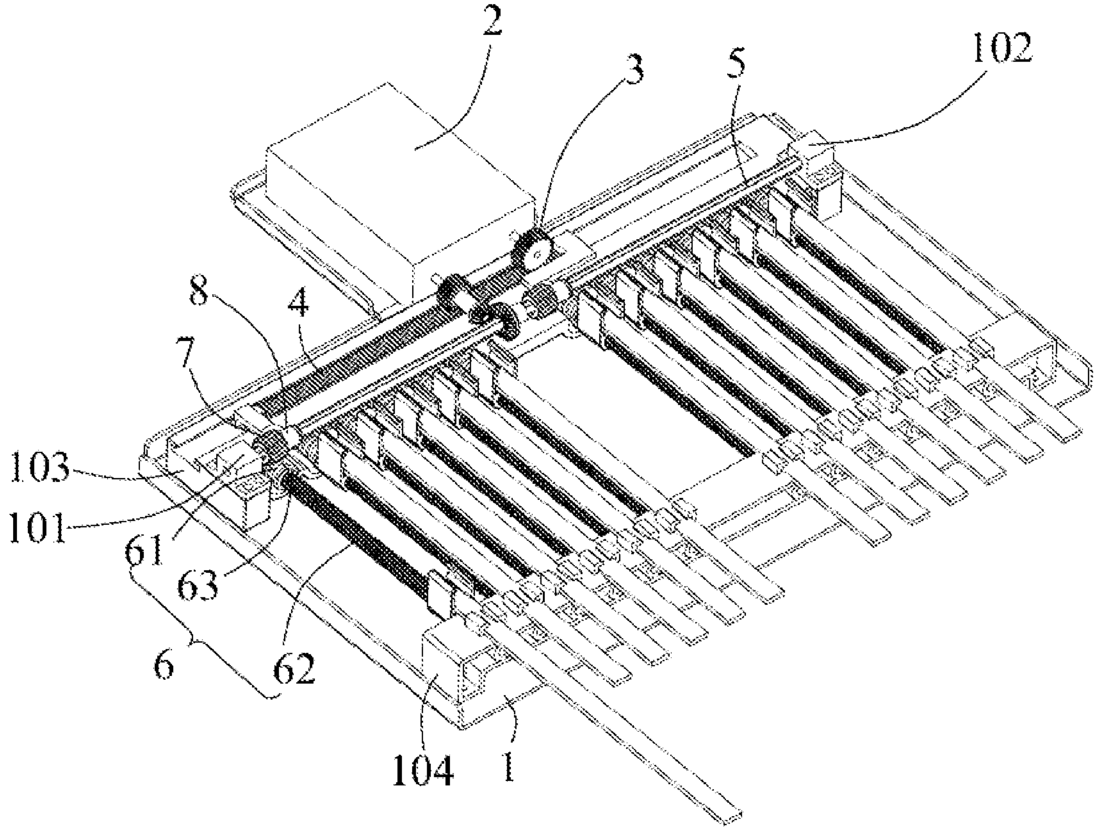
FIG. 4 is another perspective, assembled view of the actuator in accordance with the first embodiment of the present disclosure, in which one linkage is extended.
Figure 5:
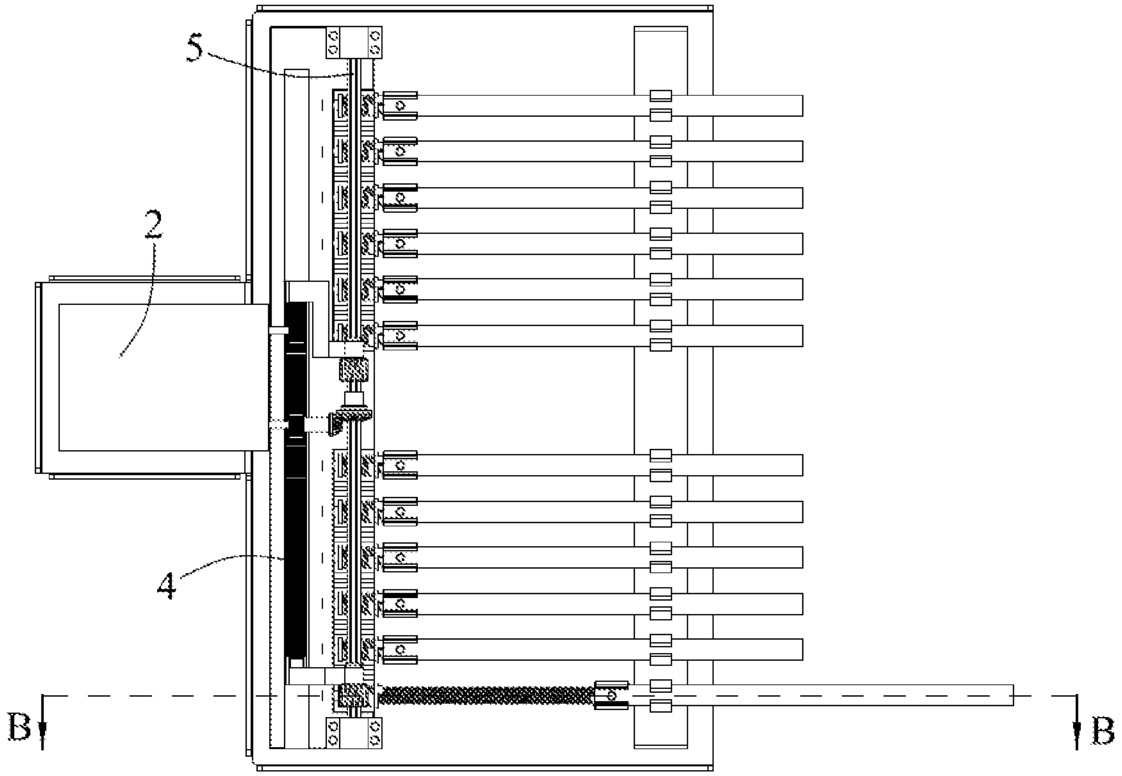
FIG. 5 is a top plan view of FIG. 4.
Figure 6:
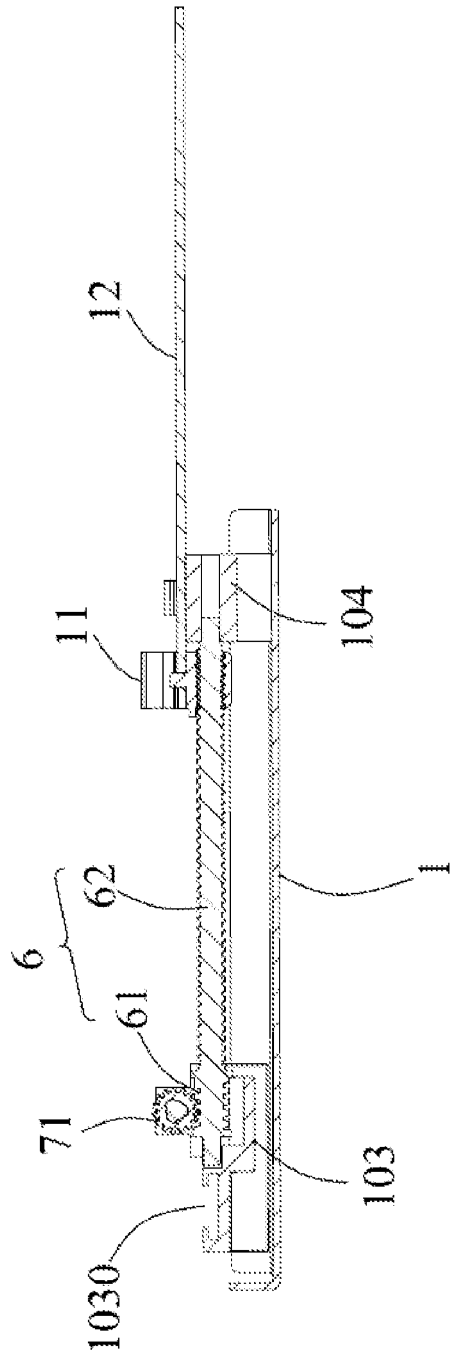
FIG. 6 is a cross-sectional view taken along line B-B in FIG. 5.
Figure 7:
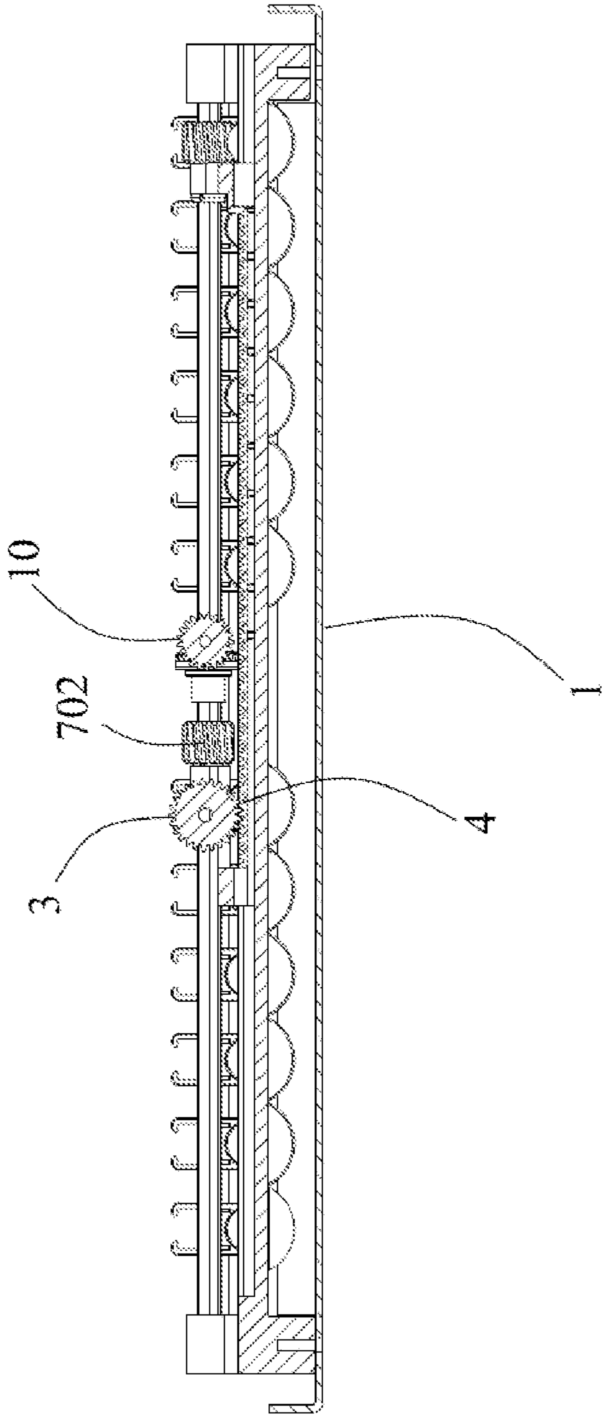
FIG. 7 is a cross-sectional view taken along line C-C in FIG. 2.

At least one exemplary embodiment will be described in detail here, examples of which are shown in drawings. When referring to the drawings below, unless otherwise indicated, same numerals in different drawings represent the same or similar elements. The examples described in the following exemplary embodiment do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “bottom” and/or “top” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Figure 8:
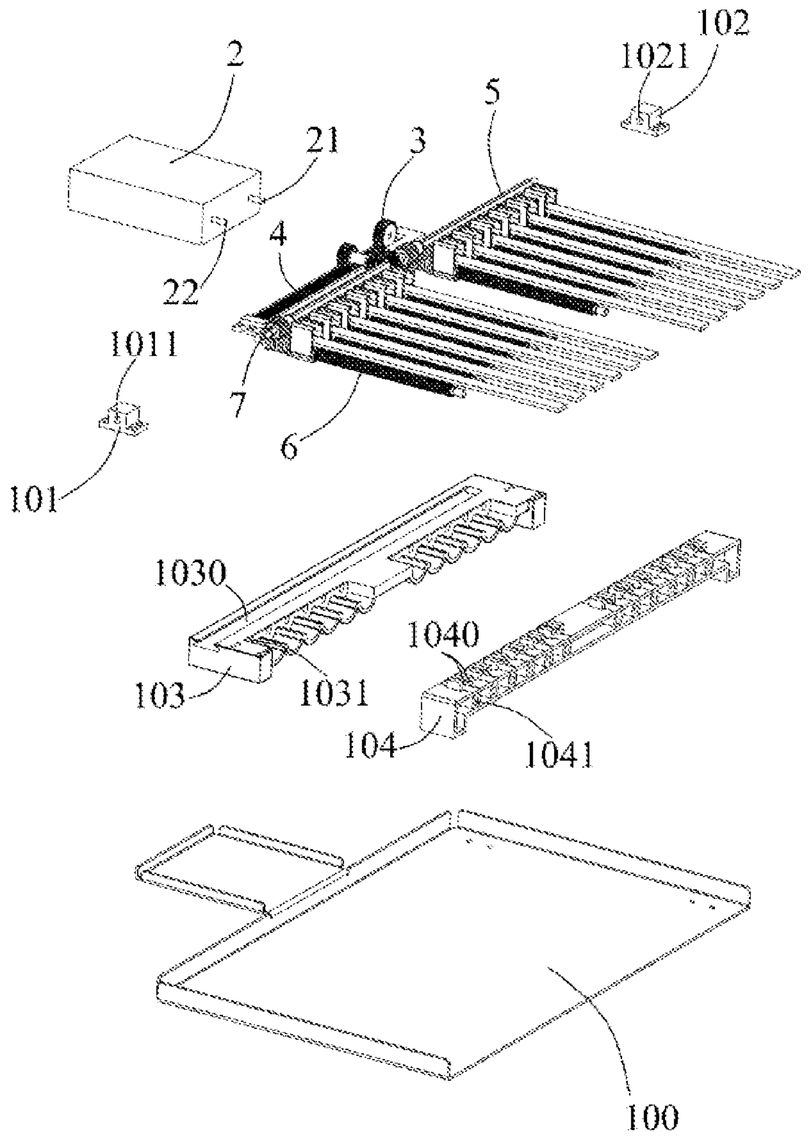
FIG. 8 is a perspective, exploded view of the actuator in accordance with the first embodiment of the present disclosure.

Referring to FIGS. 1 to 18, the present disclosure relates to an actuator, which includes a base body 1, an actuation module 2, a gear 3, a rack 4, a first rod 5, a plurality of second rods 6, a coupling member 7, a fixing member 8, a bevel gear assembly 9, an intermediate gear 10, a connecting element 11, and a plurality of telescopic rods 12. As shown in FIG. 1, the Y direction is generally regarded as a longitudinal direction, and the X direction is generally regarded as a transverse direction perpendicular to the longitudinal direction. As shown in FIG. 8, the actuation module 2 is an integrated module, that is, the actuation module 2 includes a first driving rod 21 and a second driving rod 22. The first driving rod 21 and the second driving rod 22 are two parallel output shafts located on the same integrated actuation module 2.

Referring to FIGS. 1 to 6 and FIGS. 8 to 11, when the second driving rod 22 is not in work, the first driving rod 21 drives the gear 3 to rotate around the axis of the gear 3. Because the gear 3 meshes with the rack 4 and the rack 4 extends transversely along the X direction and so, the rack 4 is slidable on the base body 1 along the X direction. The first rod 5 has a first central axis extending transversely along the X direction. When the first driving rod 21 is not in work, the second driving rod 22 drives the first rod 5 and the first rod 5 rotates around the first central axis. Each second rod 6 has a second central axis extending longitudinally along the Y direction. Driven by the first rod 5, the plurality of second rods 6 can respectively rotate around their own second central axes. The coupling member 7 is sleeved on the first rod 5, which says, the coupling member 7 is only movable on the first rod 5 but cannot rotate relative to the first rod 5. The coupling member 7 is selectively meshed with one of the second rods 6. Because the coupling member 7 is fixedly connected to the rack 4, the transverse slippage of the rack 4 drives the movement of the coupling member 7 on the first rod 5. The rotation of the coupling member 7 drives the rotation of the second rod 6 along with the rotation of the first rod 5. The connecting elements 11 are slidably connected to the second rods 6 in one-to-one correspondence, and, the connecting elements 11 fix the telescopic rods 12 in one-to-one correspondence, for stretching out and retracting of the corresponding telescopic rods 12.

Referring to FIGS. 1 to 8, FIG. 11, and FIG. 12, the base body 1 includes a bottom plate 100, a first block portion 101, a second block portion 102, a first bracket 103 and a second bracket 104. The first bracket 103 and the second bracket 104 extend in the transverse direction. The first bracket 103 and the second bracket 104 are arranged on the bottom plate 100 at intervals in the longitudinal direction. The first block portion 101 and the second block portion 102 are mounted on the left and right sides of the first bracket 103 in the transverse direction. The first block portion 101 has a first aperture 1011 and the second block portion 102 has a second aperture 1021. The first aperture 1011 and the second aperture 1021 are face oppositely in the transverse direction. The two end portions 51, 52 of the first rod 5 can be respectively positioned in the first aperture 1011 and the second aperture 1021. That is, the first rod 5 is transversely positioned on the base body 1. The first bracket 103 has a plurality of third apertures 1031 arranged side by side in the transverse direction, and the second bracket 104 has a plurality of fourth apertures 1041 arranged side by side in the transverse direction too. The third apertures 1031 and the fourth apertures 1041 are arranged in a one-to-one correspondence in the longitudinal direction, so as to respectively position the two end portions 611, 621 of the second rod 6. That is, the second rod 6 is longitudinally positioned on the base body 1. The first block portion 101, the second block portion 102, the first bracket 103, and the second bracket 104 are separated from the bottom plate 100, facilitating installation of the first rod 5 and the second rod 6. The first bracket 103 also includes a sliding track 1030 providing movement of the rack 4 along the transverse direction. The second bracket 104 also includes a pair of second locking arms 1040 confining movement of the telescopic rod 12 along the longitudinal direction.

Referring to FIG. 1 to FIG. 8, in the present embodiment as clearly and particularly shown in FIG. 8, the actuation module 2 is an integrated module, that is, the actuation module 2 includes both the first driving rod 21 and the second driving rod 22. The first driving rod 21 and the second driving rod 22 are two parallel output shafts located on the same integrated actuation module 2. In an alternative embodiment, the first driving rod 21 and the second driving rod 22 may also be located on different two modules that are set independently. For example, the first driving rod 21 is perpendicular to the second driving rod 22. The first driving rod 21 is located on one side of the rack 4 and is used to drive the gear 3. The second driving rod 22 is located at one end of the first rod 5 (near the first block portion 101 or the second block portion 102), and is used to drive the first rod 5. It should be emphasized that, the first driving rod 21 and the second driving rod 22 work asynchronously in the present disclosure. In other words, when the second driving rod 22 stops working, the first driving rod 21 starts working; when the first driving rod 21 stops working, the second driving rod 22 starts working.

Figure 9:
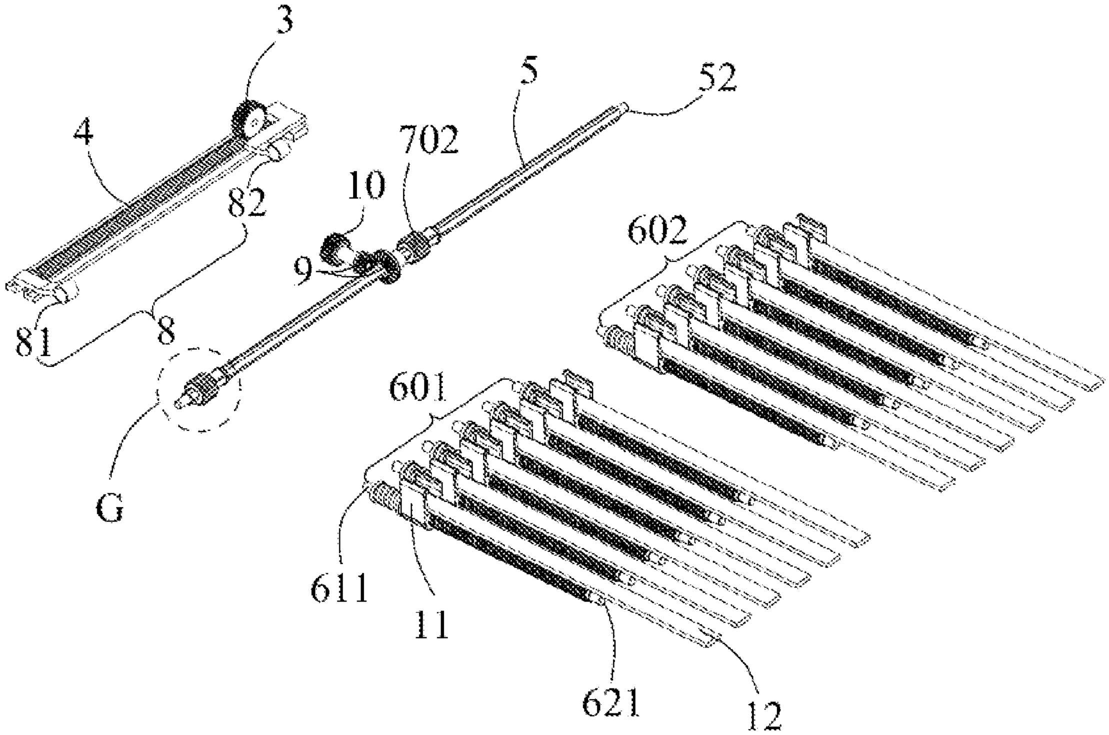
FIG. 9 is a perspective, partly exploded view of the actuator in accordance with the first embodiment of the present disclosure.

Referring to FIG. 8 and FIG. 9, both the rack 4 and the sliding track 1030 extend in the transverse direction. The rack 4 is installed in the sliding track 1030. The gear 3 is generally arranged as a cylindrical gear located above the rack 4. The teeth on the gear 3 can mesh with the teeth on the rack 4. The output shaft of the first driving rod 21 is connected to the shaft center of the gear 3 from one side of the rack 4. The first driving rod 21 pushes the rack 4 to slide in the sliding track 1030 by driving the gear 3. Because of the installation position and meshing mode of the gear 3 and the rack 4, the sliding direction of the rack 4 can be determined to be the transverse direction. The sliding track 1030 is only used to ensure that the rack 4 does not deviate from the correct direction during movement. Therefore, the sliding track 1030 is not necessary.

Figure 18:
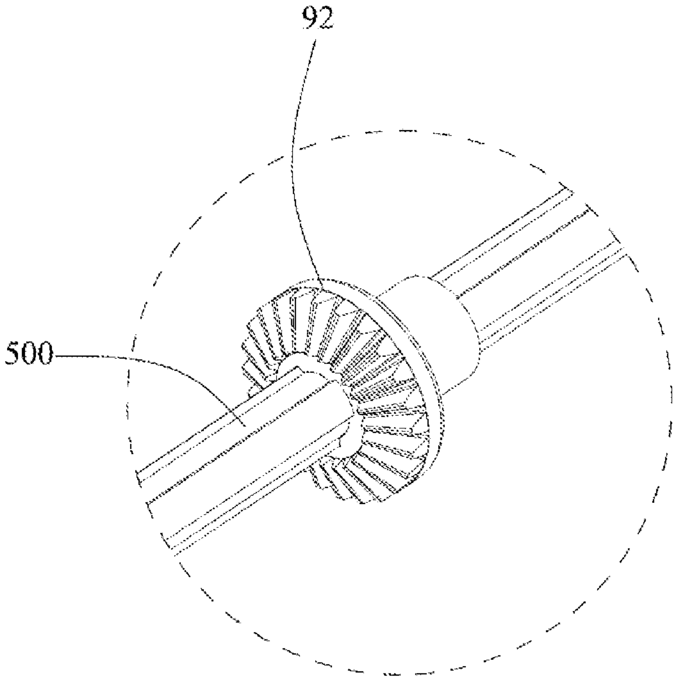
FIG. 18 is an enlarged view of part H in FIG. 10.
Figure 19:
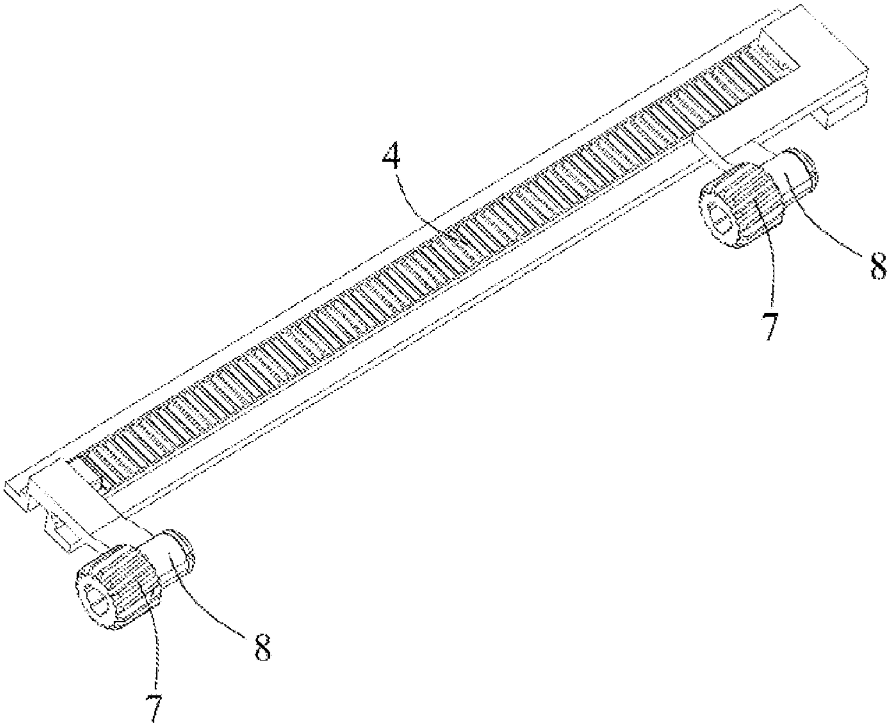
FIG. 19 is a perspective, assembled view of a shaft sleeve and a coupling element in a modified embodiment of the present disclosure.
Figure 20:
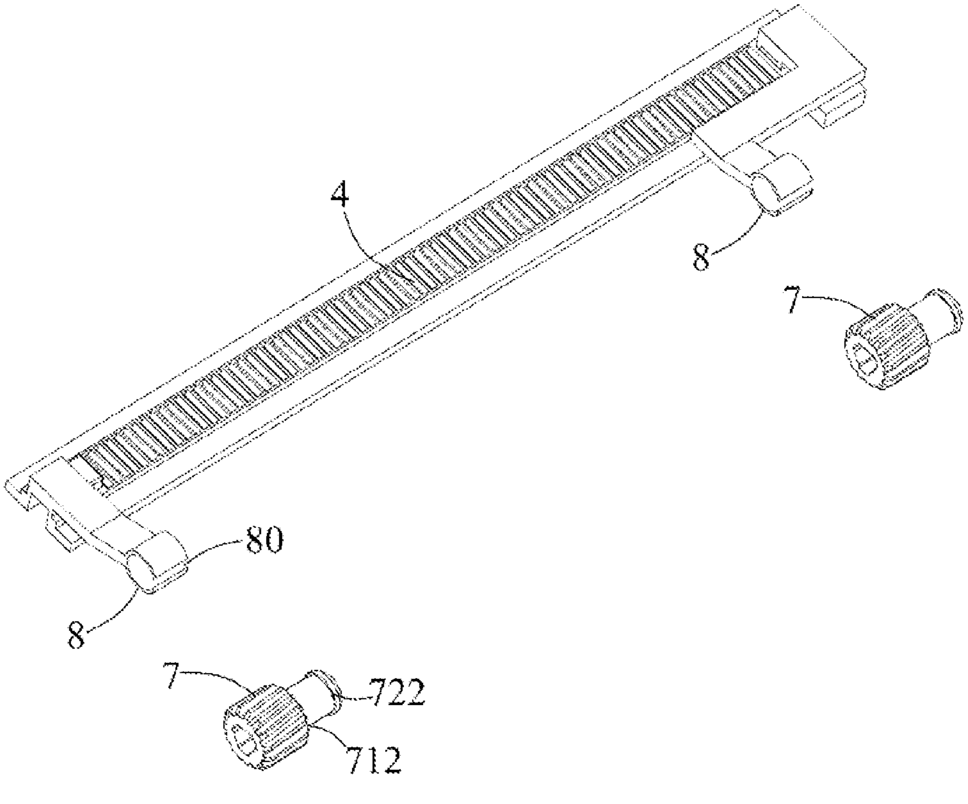
FIG. 20 is a perspective, exploded view of the shaft sleeve and the coupling element in the modified embodiment of the present disclosure.

Referring to FIG. 1 to FIG. 10, the first rod 5 includes a main body portion 50, a first end portion 51 and a second end portion 52. The first end portion 51 and the second end portion 52 are oppositely arranged in the transverse direction. The main body portion 50 is connected between the first end portion 51 and the second end portion 52. The first end portion 51 is pivotally connected to the first block portion 101 and the second end portion 52 is pivotally connected to the second block portion 102. Therefore, when the second driving rod 22 drives the first rod 5, the first rod 5 rotates around its own first central axis. The outer surface of the main body portion 50 is recessed to form at least one slide groove portion 500. The at least one slide groove portion 500 extends along the transverse direction. In the present embodiment as shown in FIG. 18, the slide groove portions 500 may be two or three which are spaced apart along the circumferential direction of the main body portion 50; and clearly shown in FIG. 18, the two or three slide groove portions 500 are arranged in parallel in the transverse direction.

Referring to FIG. 8 and FIGS. 11 to 14, each of the second rods 6 includes a worm rod portion 61 and a screw rod portion 62 integrally extending from the worm rod portion 61. Both the worm rod portion 61 and the screw rod portion 62 are provided with threads. Each of the second rods 6 includes a third end portion 611 and a fourth end portion 621 disposed opposite in the longitudinal direction. The third end portion 611 is located at the free outer end of the worm rod portion 61, and the fourth end portion 621 is located at the free outer end of the screw rod portion 62. The third end portion 611 is pivotally connected to the first bracket 103 and the fourth end portion 621 is pivotally connected to the second bracket 104. Therefore, when the first rod 5 is engaged with one of the second rods 6 through the coupling member 7, the second rod 6 rotates around its own second central axis. Of course, the second rod 6 may also not include the worm rod portion 61 extending integrally with the screw rod portion 62, but a gear (such as a helical gear) is fixedly sleeved at a certain position of the screw rod portion 62. The gear needs to be able to mesh with the worm wheel portion 71 described below, and the meshing transmission between the first rod 5 and the second rod 6 through the coupling member 7 can also be realized.

Figure 15:
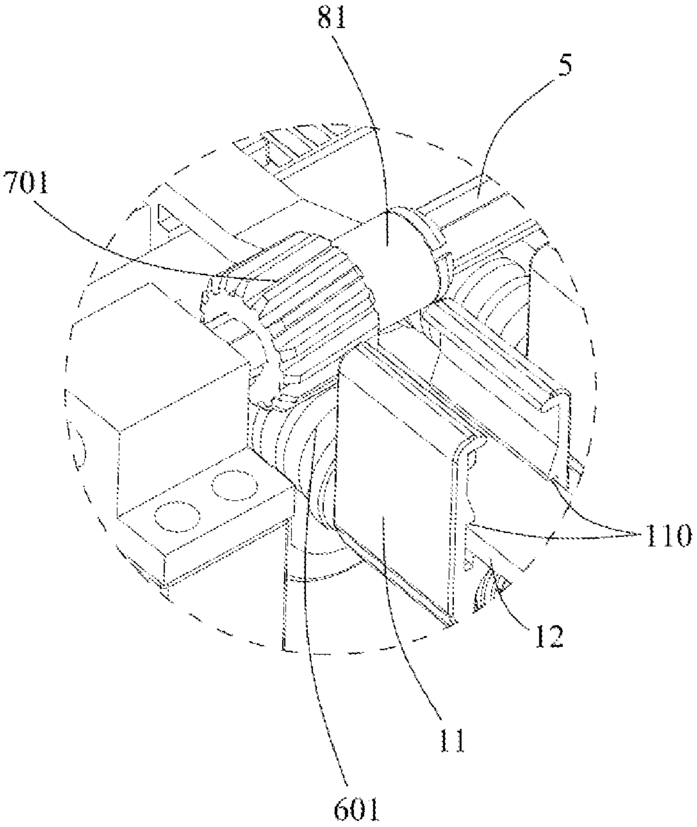
FIG. 15 is an enlarged view of part E in FIG. 1.
Figure 16:
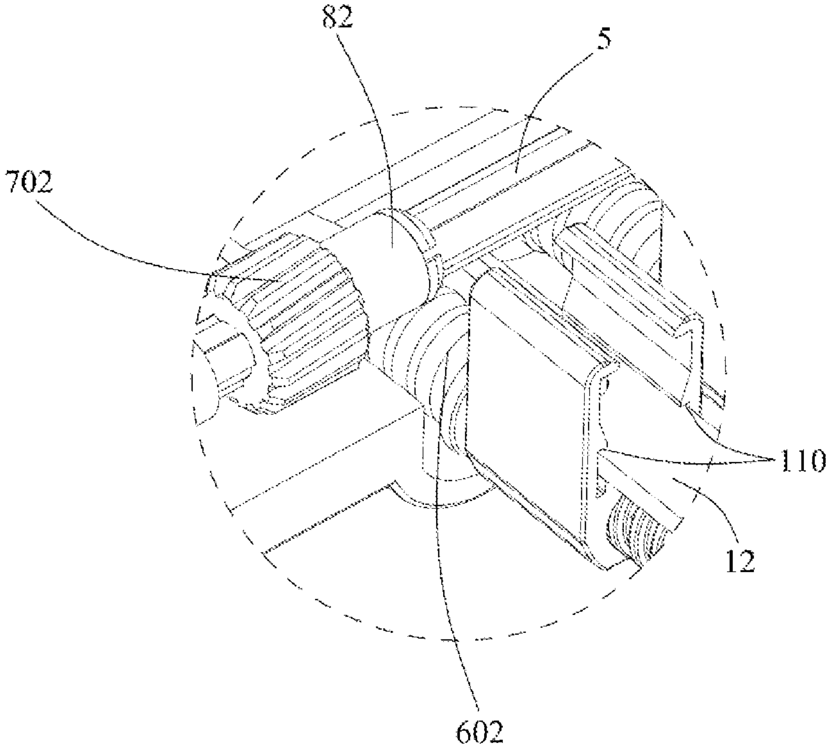
FIG. 16 is an enlarged view of part F in FIG. 1.
Figure 17:
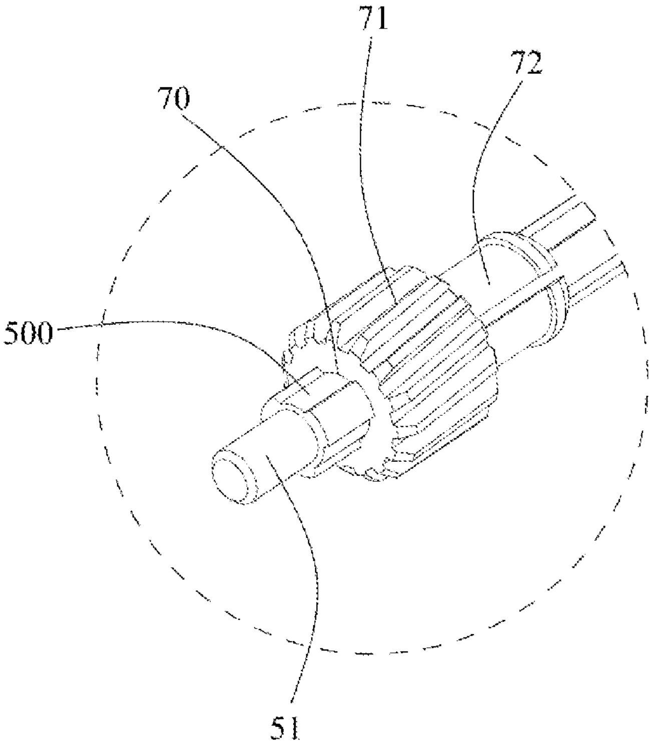
FIG. 17 is an enlarged view of part Gin FIG. 9.

Referring to FIG. 8 and FIG. 15, the coupling member 7 includes a worm wheel portion 71 and a positioning portion 72 integrally extending from the worm wheel portion 71. The worm wheel portion 71 is hollow inside and provided with tooth lines on the outside. In other embodiments, the positioning portion 72 may also be fixedly connected to the worm wheel portion 71 (for example, the positioning portion 72 is welded to one side of the worm wheel portion 71). The entire inner surface of the coupling member 7 is uniformly provided with at least one protruding portion 70 facing the axis. The entire inner surface of the coupling member 7 includes the inner surface of the worm wheel portion 71 and the inner surface of the positioning portion 72. The protruding portions 70 are mated with the slide groove portions 500 correspondingly. With such arrangement, the present disclosure ensures that the coupling member 7 can move on the first rod 5 but the coupling member 7 cannot rotate relative to the first rod 5. That is, the rotation of the first rod 5 around the axis must drive the coupling member 7 to rotate coaxially.

Figure 10:
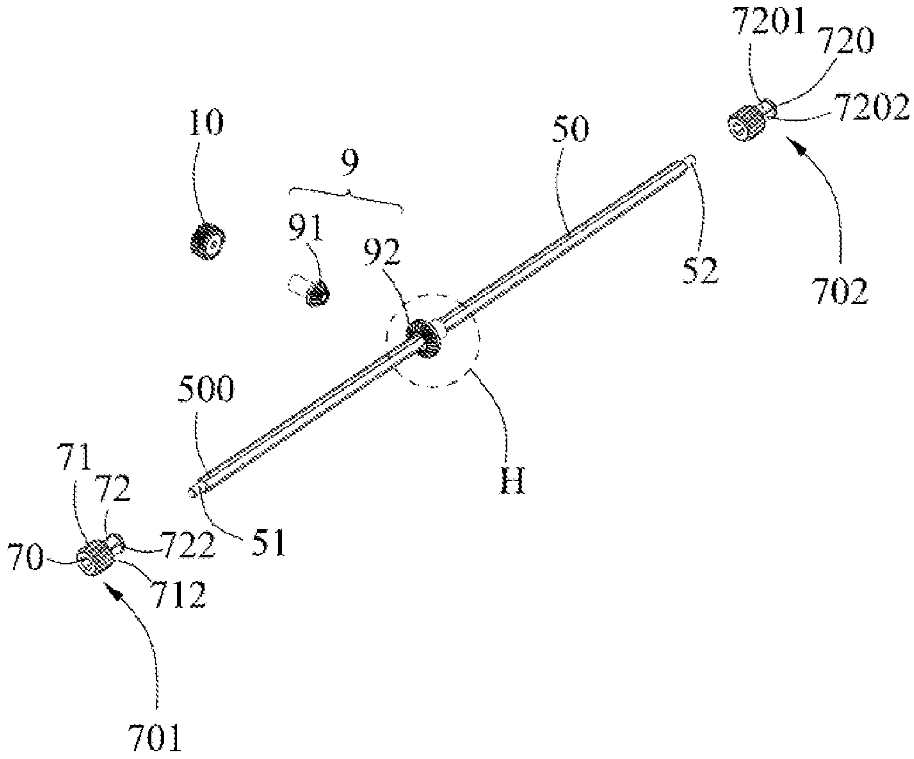
FIG. 10 is a perspective, further exploded view of some components in FIG. 9.

Referring to FIG. 9 and FIG. 10, the fixing member 8 is integrally connected to one side of the rack 4. In other embodiments, the fixing member 8 can also be fixed (e.g. welded) on one side of the rack 4. The fixing member 8 is annularly sleeved on the positioning portion 72 of the coupling member 7. Both the inner surface of the fixing member 8 and the outer surface of the positioning portion 72 are smooth arc surfaces, which ensure the relative rotation between the coupling member 7 and the fixing member 8. A resisting wall portion 712 is formed between the bottom surface of the worm wheel portion 71 and the outer surface of the positioning portion 72. The positioning portion 72 has a free outer end relatively far away from the worm wheel portion 71. A resisting rib portion 722 protrudes from the free outer end of the positioning portion 72. The fixing member 8 is clamped and positioned between the resisting wall portion 712 and the resisting rib portion 722. The coupling member 7 and the fixing member 8 cannot move relative to each other, and therefore, the fixing member 8 can drive the coupling member 7 to move on the first rod 5.

Referring to FIG. 9, the fixing member 8 is shaped to be a closed ring with a O-shaped. Corresponding to the ring-shaped fixing member 8, the positioning portion 72 includes at least two parts spaced apart from each other on the circumferential surface. For example, the positioning portion 72 includes a first arc surface 7201 and a second arc surface 7202. Two gaps 720 are defined between the first arc surface 7201 and the second arc surface 7202. With the two gaps 720 between the first arc surface 7201 and the second arc surface 7202, the positioning portion 72 can be compressed to have a certain degree of elasticity. After the fixing member 8 is sleeved on the positioning portion 72, the positioning portion 72 can elastically return to their original state. The ring-shaped fixing member 8 is assembled from the side where the resisting rib portion 722 of the coupling member 7 is located (or, it can be understood that the side where the resisting rib portion 722 of the coupling member 7 is located enters the ring-shaped fixing member 8 first). The outermost side of the resisting rib portion 722 of the coupling member 7 preferably forms a guiding portion. With the guidance of the guide portion, the fixing member 8 abuts against the resisting rib portion 722 to compress the arc surfaces 7201/7202 at first, and then continues to move forward, and finally is stably clamped between the resisting wall portion 712 and the resisting rib portion 722.

Figure 11:
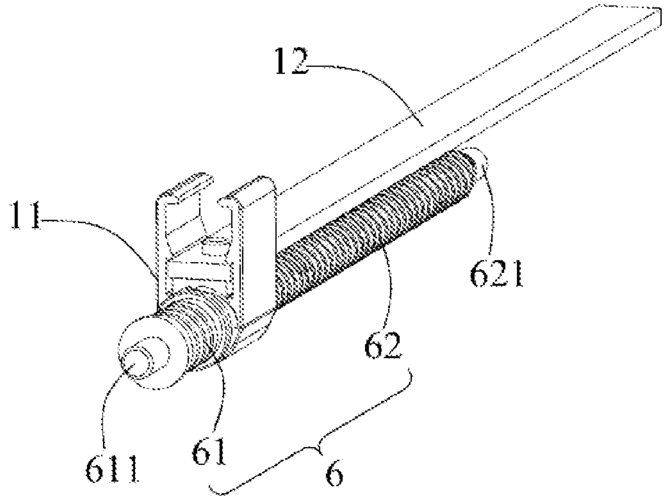
FIG. 11 is a perspective, assembled view of a second rod, a connecting element and a plurality of telescopic rods in the actuator of the present disclosure.
Figure 12:
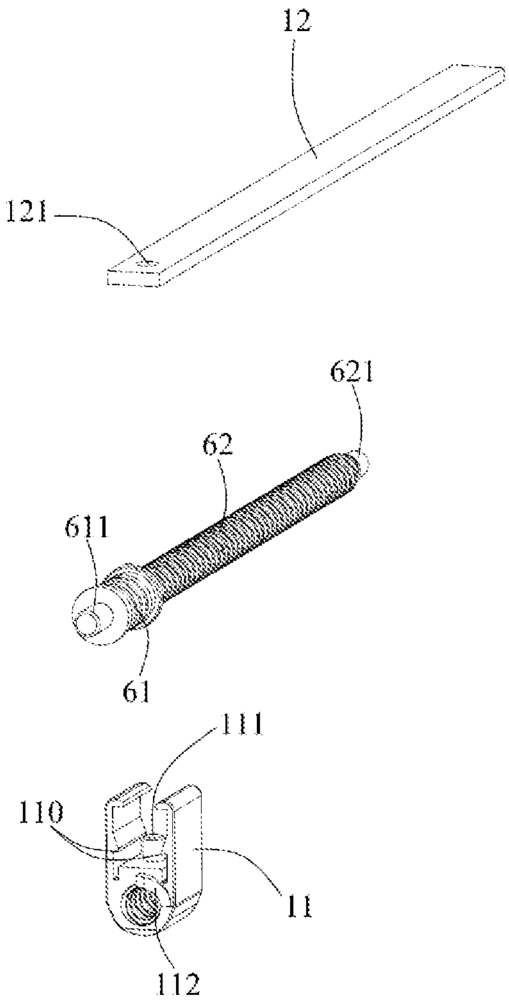
FIG. 12 is a perspective, exploded view of the second rod, the connecting element and the plurality of telescopic rods of FIG. 11.

Referring to FIG. 11 and FIG. 12, the fixing member 8 may also be a C-shaped snap ring with an opening 80 in other embodiments. The C-shaped fixing member 8 does not need to be assembled from the side where the resisting rib portion 722 of the coupling member 7 is located and does not require the positioning portion 72 to be elastic, but only requires the C-shaped fixing member 8 to be slightly elastic and the C-shaped fixing member 8 is greater than half the circumference of the O-shaped closed ring, so that the positioning portion 72 is directly snapped into the C-shaped fixing member 8 from the opening 80 with small force. The assembly between the fixing member 8 and the positioning portion 72 is easily completed in such condition too.

Referring to FIG. 1, FIG. 9, FIG. 15 and FIG. 16, in an alternative embodiment, the fixing member 8 includes a first fixing member 81 and a second fixing member 82. The coupling member 7 includes a first coupling member 701 and a second coupling member 702. The first coupling member 701 and the second coupling member 702 are disposed on the first rod 5 at intervals. The first fixing member 81 is sleeved on the positioning portion 72 of the first coupling member 701 and the second fixing member 82 is sleeved on the positioning portion 72 of the second coupling member 702. The second rods 6 include a first rod assembly 601 on the left side and a second rod assembly 602 on the right side. The transverse sliding of the rack 4 drives the synchronous movement of the first coupling member 701 and the second coupling member 702 on the first rod 5. The synchronous movement of the first coupling member 701 and the second coupling member 702 makes: when the first coupling member 701 is meshed with any one of the second rods 6 of the first rod assembly 601, the second coupling member 702 is separated from all the second rods 6 of the second rod assembly 602, or, when the second coupling member 702 is engaged with any one of the second rods 6 of the second rod assembly 602, the first coupling member 701 is separated from all the second rods 6 of the first rod assembly 601. That is, although two of the fixing members 8 and two of the coupling elements 7 are provided, the rack 4 of the present disclosure can be moved to a certain position to make sure that only one of the second rods 6 extends out of the second bracket 104, to avoid the phase interference caused by the simultaneous extension of the two second rods 6.

Referring to FIGS. 1 to 6, FIG. 9 and FIG. 10, in the present disclosure, the second driving rod 22 drives the first rod 5 to rotate around the first central axis through the bevel gear assembly 9. The bevel gear assembly 9 includes a first bevel gear 91 and a second bevel gear 92. The first bevel gear 91 is connected to the second driving rod 22, the first bevel gear 91 meshes with the second bevel gear 92, the second bevel gear 92 is fixedly sleeved on the first rod 5, and therefore, the second driving rod 22 drives the first rod 5 rotates around the first central axis via the bevel gear assembly 9. In this disclosure, because the first driving rod 21 and the second driving rod 22 are two parallel output shafts arranged on the same actuation module 2, the function of the bevel gear assembly 9 is to change the rotation of the output shaft of the second driving rod 22 in the longitudinal direction by 90 degrees, and then realize the rotation of the first rod 5 in the transverse direction.

Referring to FIG. 1 and FIGS. 7 to 10, in view of the fact that the first driving rod 21 and the second driving rod 22 are two parallel output shafts arranged on the same actuation module 2, the actuation module 2 can realize the control of the first driving rod 21 and the second driving rod 22 by using a switch such as a single-pole&double-throw switch (not shown). That is: the single-pole&double-throw switch is biased to one side to realize a working state of the first driving rod 21 and a non-working state of the second driving rod 22, and the single-pole&double-throw switch is biased to another side to realize the non-working state of the first driving rod 21 and the working state of the second driving rod 22. Since the output shaft of the first driving rod 21 is directly connected to the axis center of the gear 3 from the front side of the rack 4, the actuation module 2 is located at the front side of the rack 4. The front side of the rack 4 refers to the side of the rack 4 away from the first rod 5. That is to say, the actuation module 2 and the first rod 5 are located on opposite sides of the rack 4, resulting in a relatively long distance between the output shaft of the second driving rod 22 and the bevel gear assembly 9 which is driven by the second driving rod 22. Therefore, in this disclosure, the connection between the second driving rod 22 and the first bevel gear 91 is achieved through the intermediate gear 10. The intermediate gear 10 is located above the rack 4 but is always separated from the rack 4. The use of the intermediate gear 10 overcomes the problem of long-distance obstacles between the output shaft of the second driving rod 22 and the bevel gear assembly 9 on the one hand, and on the other hand, two sides of the intermediate gear 10 can also be designed with different sizes of central apertures, which solves the problem that the size of the output shaft of the second driving rod 22 does not match a size of the shaft center of the first bevel gear 91. Of course, the output shaft of the second driving rod 22 can also be directly embedded in the axis of the first bevel gear 91 in the same way as the output shaft of the first driving rod 21 is embedded in the axis of the gear 3, which requires that the output shaft of the second driving rod 22 is relatively long and equal in size to the shaft center of the first bevel gear 91.

Referring to FIG. 11, each of the connecting elements 11 has internal threads, and each screw rod portion 62 of the second rod 6 has external threads. Depending on the cooperation between the internal threads and the external threads, each connecting element 11 is slidably positioned on the corresponding second rod 6. The second rod 6 only rotates but does not move during movement of the connecting element 11. The movement principle of the connecting element 11 on the second rod 6 is well-known to those persons skilled in the art, and will not be repeatedly described in this disclosure.

Figure 13:
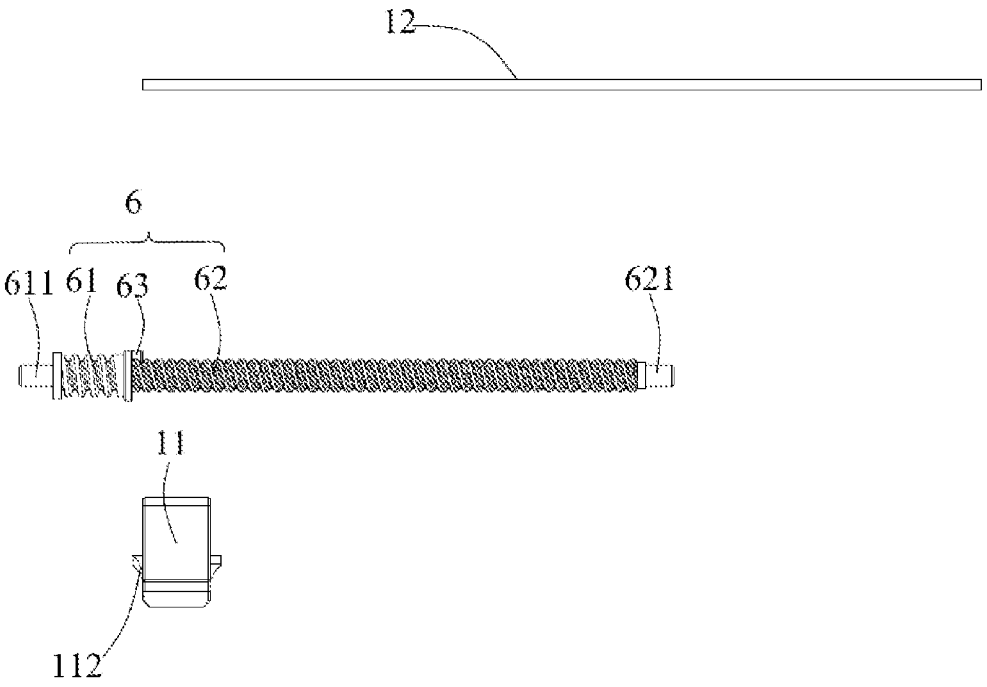
FIG. 13 is a right side view of FIG. 12.

Referring to FIGS. 11 to 13, it should be noted that, each connecting element 11 has a positioning post 111 and each telescopic rod 12 has a positioning hole 121 corresponding to the positioning post 111 (or, each connecting element 11 has a positioning hole and each of the telescopic rods 12 has a positioning post corresponding to the positioning hole). Depending on the cooperation between the positioning post 111 and the positioning hole 121, the telescopic rod 12 is positioned on the connecting element 11. A buckling arm is formed on the at least one top of the connecting element 11 and the base body 1. The buckling arm constrains the telescopic rod 12 from both sides of the telescopic rod 12. The cooperation between the positioning post 111 and the positioning hole 121 only provides relative orientation between the connecting element 11 and the telescopic rod 12 without forming a fixing effect. A pair of first locking arms 110 extends upwards on both sides of each positioning post 111 and a plurality of second locking arms 1040 is formed on the top of the second bracket 104. The first locking arms 110 and the corresponding second locking arms 1040 respectively fit against the two sides of the same telescopic rod 12 to prevent the telescopic rod 12 from deviating from the correct position when moving. Because the second bracket 104 is installed on the bottom plate 100 and the second bracket 104 is a part of the base body 1, which is equivalent to setting the second locking arms 1040 on the base body 1. Therefore, if the locking arms are used to restrict the telescopic rod 12, it only needs to set the locking arms on one of the connecting element 11 and the base body 1.

Of course, it may not provide the locking arms to prevent the deviation of the telescopic rod 12. For example, it can be altered into other embodiments: on the basis that the top of the connecting element 11 is provided with a positioning post 111 and the front end of each telescopic rod 12 is correspondingly provided with a positioning hole 121, then filling the positioning hole 121 with solder. Other embodiments in which the positioning hole 121 is filled with solder have already fixed the telescopic rod 12 and the connecting element 11 well and there is no need to restrict on both sides of the telescopic rod 12.

Figure 14:
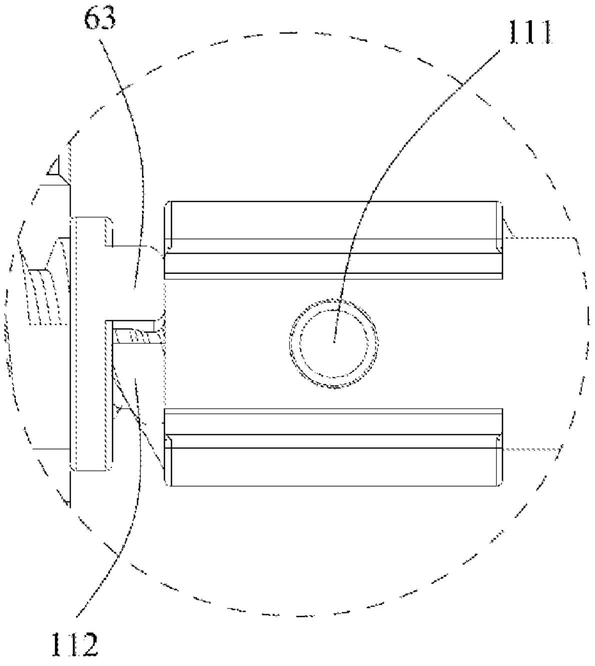
FIG. 14 is an enlarged view of part D in FIG. 2.

Referring to FIG. 13 and FIG. 14, a braking portion 63 is formed between the worm rod portion 61 and the screw rod portion 62 of the second rod 6. A stopper portion 112 is formed on at least one of the opposite front and rear surfaces of the connecting element 11. The front stopper portion 112 (that is formed on the front surface of the connecting element 11) is used to abut against the braking portion 63 during the retraction process of the telescopic rod 12. The rear stopper portion 112 (that is formed on the rear surface of the connecting element 11) is used to abut against the rear second bracket 104 during the extension of the telescopic rod 12. In other embodiments of the present disclosure, the second bracket 104 also forms the braking portion 63, which is equivalent to that the base body 1 is also provided with the braking portion 63.

The actuator of the present disclosure converts the transverse movement of the rack 4 into the transverse movement of the coupling member 7 on the first rod 5 through the fixing member 8. The transverse movement described here is for selecting one telescopic rod 12 from the plurality of telescopic rods 12 for subsequent longitudinal movement. The actuator of the present disclosure transforms the rotation of the first rod 5 in the transverse direction into the rotation of the second rod 6 in the longitudinal direction through the engagement between the worm wheel portion 71 and the worm rod portion 61. The rotation described here is to transmit power to the selected telescopic rod 12. Through the internal and external thread engagement between the screw rod portion 62 and the connecting element 11, the actuator of the present disclosure converts the rotation around the axis of the second rod 6 in the longitudinal direction into a corresponding longitudinal movement of the telescopic rod 12, to realize the phase adjustment of the multiphase shifter. The actuator of the present disclosure saves the space of the actuator in the height direction by arranging a plurality of the telescopic rods 12 parallel in the longitudinal direction. The first driving rod 21 of the actuator of the present disclosure drives the rack 4 extending in the transverse direction and the longitudinal telescopic rods 12 are selected to be driven through the transverse movement of the rack 4, for saving the space of the actuator in the longitudinal direction. The second driving rod 22 of the disclosed actuator drives the first rod 5 and the second rod 6 which two are perpendicular to each other. The first rod 5 rotates in the transverse direction and the second rod 6 rotates in the longitudinal direction. The first rod 5 and the second rod 6 are meshed through the coupling member 7, and the power transmission in the present disclosure is more stable and precise.

The above embodiments are only used to illustrate the present disclosure and not to limit the technical solutions described in the present disclosure. The understanding of this specification should be based on those skilled in the art. Descriptions of directions, such as "front", "back", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An actuator, configured for multiphase shifter, comprising:

a base body;

a first driving rod and a second driving rod working asynchronously;

a gear and a rack, when the first driving rod is in work and the second driving rod is not in work, the first driving rod drives the gear to rotate around an axis of the gear, the gear engages with the rack, the rack extends along a transverse direction, the rack is slidable on the base body along the transverse direction;

a first rod being positioned on the base body, the first rod having a first central axis extending along the transverse direction, when the first driving rod is not in work and the second driving rod is in work, the gear still keeps engaging with the rack and the second driving rod drives the first rod to rotate around the first central axis;

a plurality of second rods being positioned on the base body, each second rod having a second central axis extending along a longitudinal direction, the second rods being rotable around their own second central axes when they are respectively driven by the first rod;

a coupling member being sleeved on the first rod and selectively mating with one of the second rods, the coupling member being fixedly connected to the rack, a transverse slippage of the rack driving a movement of the coupling member on the first rod, a rotation of the coupling member accompanying with a rotation of the first rod for driving a rotation of the second rod; and a plurality of connecting elements and a plurality of telescopic rods, each connecting element sliding on a corresponding telescopic rod, for stretching out and retracting of the corresponding telescopic rod; wherein the gear and the rack are maintained in an engagement state throughout each stage of the actuator.

2. The actuator according to claim 1, wherein the coupling member comprises a worm wheel portion with teeth, each of the second rods comprises a worm rod portion with threads, the worm wheel portion is engagable the worm rod portion.

3. The actuator according to claim 2, wherein the rack forms a fixing member at one side thereof, the coupling member comprises a positioning portion integrally extending from the worm wheel portion, the fixing member is meshed with the positioning portion.

4. The actuator according to claim 3, wherein the positioning portion forms a resisting wall portion and a resisting rib portion at two opposite sides thereof, the fixing member is positioned between the resisting wall portion and the resisting rib portion.

5. The actuator according to claim 4, wherein the positioning portion comprises a first arc surface and a second arc surface, two gaps are defined between the first arc surface and the second arc surface; the positioning portion is resilient due to the gaps, the positioning portion is compressed by the fixing member at first and then returns to its original state during an assembling process of the fixing member on the positioning portion.

6. The actuator according to claim 5, wherein the fixing member is C-shaped with an opening, and the positioning portion is directly and resiliently snapped into the fixing member from the opening; or, the fixing member is O-shaped without an opening, and the fixing member is sleeved onto the positioning portion.

7. The actuator according to claim 3, wherein the fixing member comprises a first fixing member and a second fixing member, the coupling member comprises a first coupling member and a second coupling member, the first coupling member and the second coupling member are disposed on the first rod at intervals, the first fixing member is sleeved on the positioning portion of the first coupling member, the second fixing member is sleeved on the positioning portion of the second coupling member;

wherein the second rods comprise a first rod assembly on a left side and a second rod assembly on a right side, the transverse slippage of the rack drives a synchronous movement of the first coupling member and the second coupling member on the first rod, the synchronous movement of the first coupling member and the second coupling member makes:

when the first coupling member is meshed with any one of the second rods of the first rod assembly, the second coupling member is separated from all the second rods of the second rod assembly; or, when the second coupling member is meshed with any one of the second rods of the second rod assembly, the first coupling member is separated from all the second rods of the first rod assembly.

8. The actuator according to claim 3, wherein the base body comprises a bottom plate, a first block portion, a second block portion, a first bracket and a second bracket, the first rod comprises a first end portion and a second end portion oppositely arranged in the transverse direction, the first end portion is pivotally connected to the first block portion and the second end portion is pivotally connected to the second block portion, each second rod comprises a third end portion and a fourth end portion disposed oppositely in the longitudinal direction, the third end portion is pivotally connected to the first bracket and the fourth end portion is pivotally connected to the second bracket.

9. The brush phase shifter according to claim 8, further comprising a backing plate, the backing plate comprising a top face and a bottom face which are disposed opposite to each other;

wherein the first main printed circuit board, the second main printed circuit board, the first brush member and the second brush member are positioned on the top face of the backing plate, the driving gear, the first transmission gear, the second transmission gear, the first linkage gear and the second linkage gear are positioned on the bottom face of the backing plate;

wherein the backing plate comprises a pair of through holes, the first linkage gear is correspondingly positioned on the first main printed circuit board through one of the through holes, and the second linkage gear is correspondingly positioned on the second main printed circuit board through another through hole.

10. The actuator according to claim 1, further comprising a bevel gear assembly; wherein the bevel gear assembly comprises a first bevel gear and a second bevel gear, the first bevel gear is connected to the second driving rod, the first bevel gear meshes with the second bevel gear, the second bevel gear is fixedly sleeved on the first rod, and therefore, the second driving rod drives the first rod to rotate around the first central axis via the bevel gear assembly.

11. The actuator according to claim 10, wherein the first driving rod and the second driving rod are two parallel output shafts arranged on a same actuation module, the actuation module and the first rod are located on opposite sides of the rack, an output shaft of the second driving rod can also be directly inserted in an axis of the first bevel gear.

12. The actuator according to claim 1, wherein each connecting element comprises internal threads and each second rod comprises a screw rod portion with external threads, each connecting element is slidably positioned on a corresponding second rod depending on a cooperation between the internal threads and the external threads.

13. The actuator according to claim 12, further comprising a positioning post and a positioning hole; wherein the positioning post is formed on one of the connecting element and the telescopic rod, the positioning hole is defined on a remaining one of the connecting element and the telescopic rod, the telescopic rod is positioned on the connecting element depending on a cooperation between the positioning post and the positioning hole.

14. The actuator according to claim 13, further comprising at least one pair of locking arms; wherein the locking arms respectively fit against two sides of the telescopic rod to prevent the telescopic rod from deviating from a correct position, the locking arms are formed on at least one of the connecting element and the base body.

15. An actuator, configured for multiphase shifter, comprising:

a base body;

an actuation module having both a first driving rod and a second driving rod and making sure that the first driving rod and the second driving rod do not work synchronously;

a gear, when the first driving rod is in work and the second driving rod is not in work, the first driving rod drives the gear to rotate around an axis of the gear;

a rack, the rack extending along an X direction, the rack being slidable on the base body along the X direction;

a first rod being positioned on the base body and having a first central axis extending along the X direction, when the first driving rod is not in work and the second driving rod is in work, the second driving rod drives the first rod to rotate around the first central axis;

a plurality of second rods being positioned on the base body, each second rod having a second central axis extending along a Y direction which is perpendicular to the X direction, each second rod being capable of being selected to rotate around its own second central axis;

a coupling member being sleeved on the first rod and selectively mating with one of the second rods, the coupling member being fixedly connected to the rack, a transverse slippage of the rack driving a movement of the coupling member on the first rod, a rotation of the first rod driving a rotation of the second rod via the coupling member;

a plurality of connecting elements and a plurality of telescopic rods, each connecting element sliding on a corresponding telescopic rod, for stretching out and retracting of the corresponding telescopic rod; wherein the gear and the rack are maintained in an engagement state throughout each stage of the actuator.

16. The actuator according to claim 15, wherein the coupling member comprises a first coupling member and a second coupling member, the first coupling member and the second coupling member are disposed on the first rod at intervals; and wherein the second rods comprise a first rod assembly on a left side and a second rod assembly on a right side, the transverse slippage of the rack drives a synchronous movement of the first coupling member and the second coupling member on the first rod, the synchronous movement of the first coupling member and the second coupling member makes:

when the first coupling member is meshed with any one of the second rods of the first rod assembly, the second coupling member is separated from all the second rods of the second rod assembly;

or, when the second coupling member is meshed with any one of the second rods of the second rod assembly, the first coupling member is separated from all the second rods of the first rod assembly.

17. The actuator according to claim 15, further comprising a bevel gear assembly; wherein the bevel gear assembly comprises a first bevel gear and a second bevel gear, the first bevel gear is connected to the second driving rod, the first bevel gear meshes with the second bevel gear, the second bevel gear is fixedly sleeved on the first rod, and therefore, the second driving rod drives the first rod to rotate around the first central axis via the bevel gear assembly.

18. The actuator according to claim 15, wherein the actuation module comprises a single-pole&double-throw switch, the single-pole&double-throw switch is biased to one side to realize a working state of the first driving rod and a non-working state of the second driving rod, and the single-pole&double-throw switch is biased to another side to realize the non-working state of the first driving rod and the working state of the second driving rod.

* * * * *